United States Patent Office 2,790,091
Patented Apr. 23, 1957

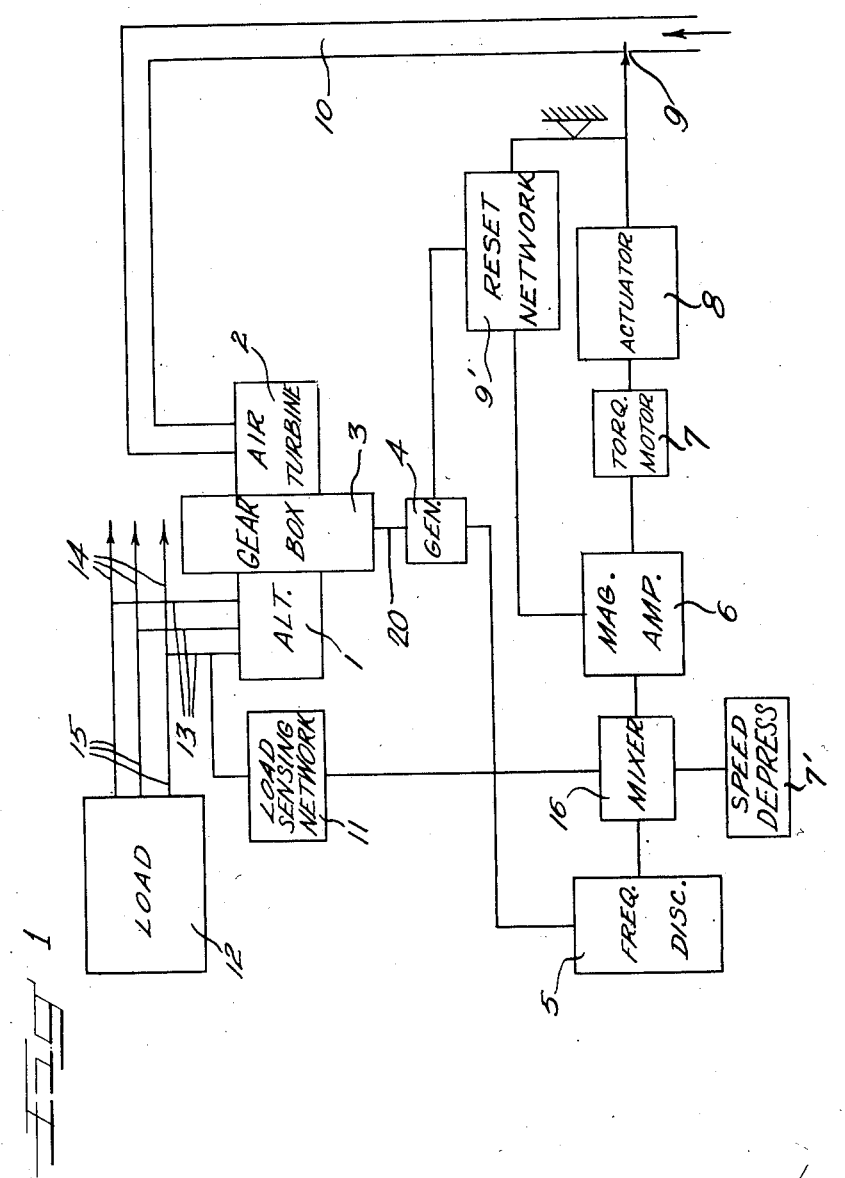

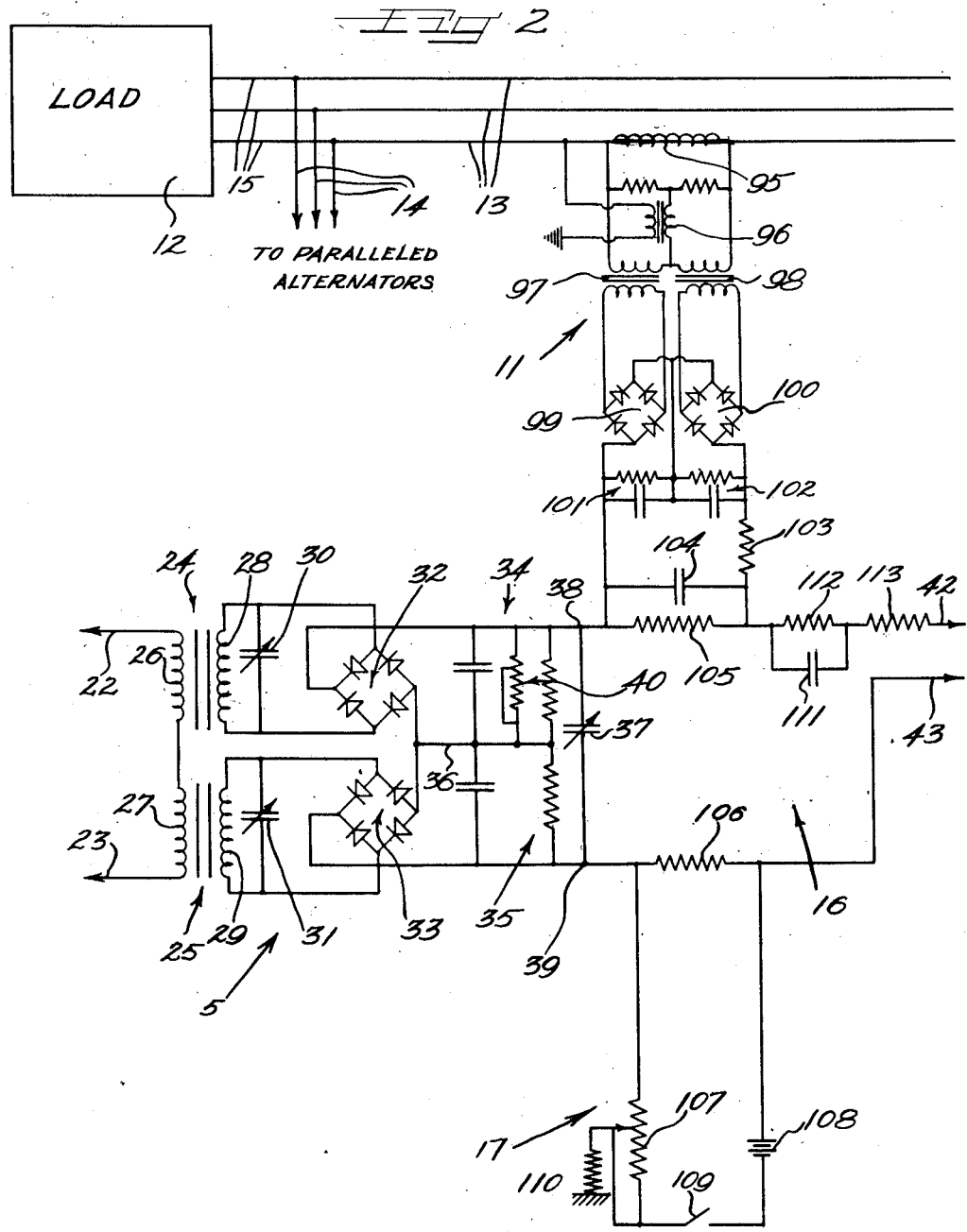

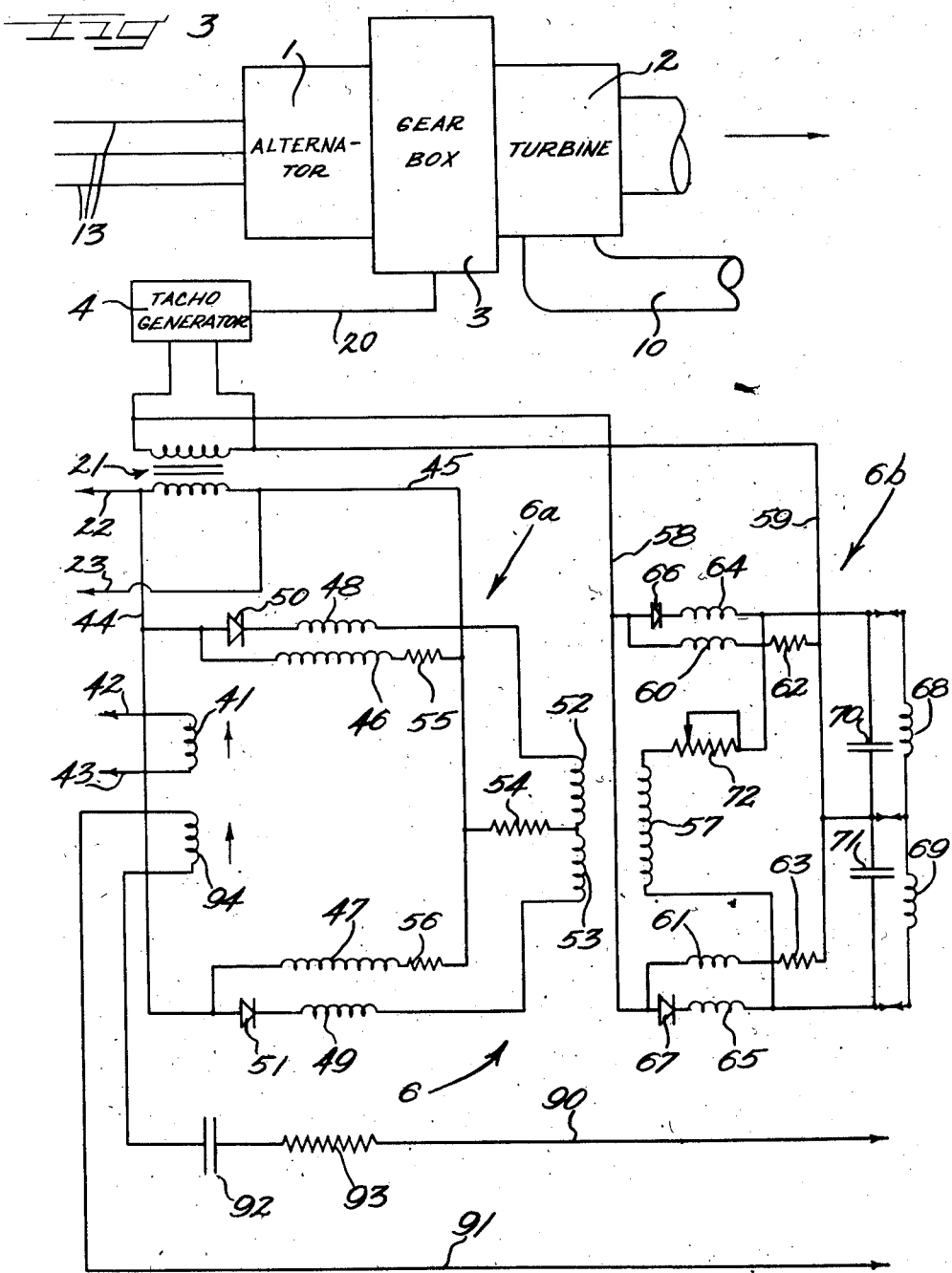

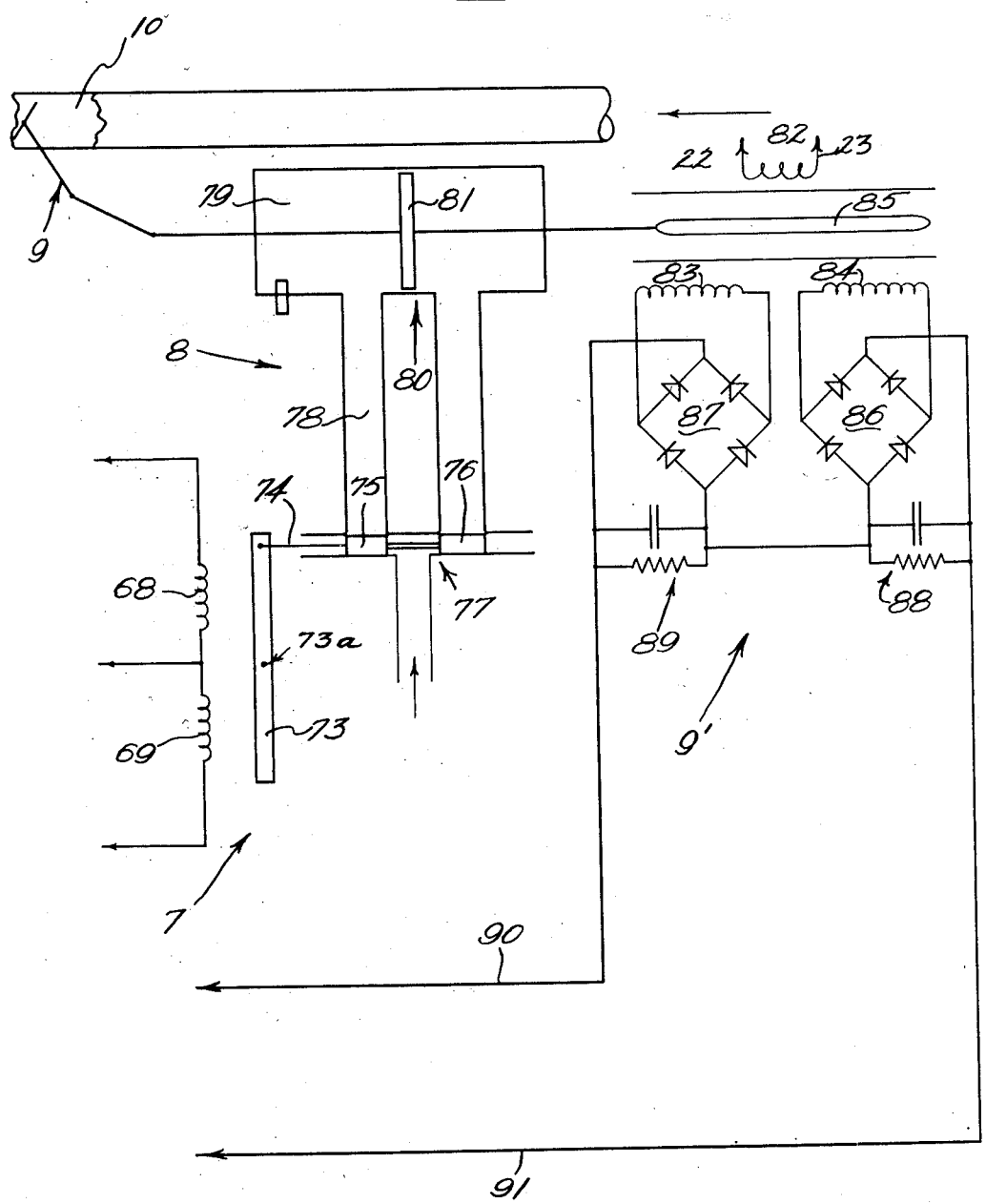

2,790,091

CONTROL SYSTEM FOR TURBINE DRIVEN ALTERNATORS

Walter R. Chapman, Bedford, and Stephen H. Fairweather, South Euclid, Ohio, assignors to Thompson Products, Inc., Cleveland, Ohio, a corporation of Ohio Application September 28, 1953, Serial No. 382,582

12 Claims. (Cl. 290—4)

The present invention relates to a control system for turbine driven alternators or the like and more particularly to control systems operating to control turbine driven alternator drives, the output of the alternators, and the load division between alternators when a plurality of the same are connected together electrically.

It is an important purpose of the present invention to accurately control a fluid actuated turbine driven alternator which may be subjected to changes in electrical load and changes in the energy and pressure of the fluid supplied to the turbine.

It is another important purpose of the present invention to permit a plurality of electrical alternators to be paralleled and to remain in synchronism with accurately regulated speed and accurately regulated load division when subjected to such disturbing forces as load variations and drive energy variations and further to maintain accurately steady state regulation of the system. These various control functions are included in systems embodying the principles of the present invention by employing the functions of proportional action together with reset action and rate action in a control system for an alternator having a scheduled, manufactured load droop characteristic of pre-selected features. The proportional action and the reset action combine to compensate for variations in the load and drive parameters while the rate action is an important aid in stabilization of the control system.

In accurately controlling paralleled alternator systems, the systems should be accurately controlled voltage-wise, frequency-wise and load division-wise so that they may be synchronously paralleled on the supply line. The problem of voltage control, which will be spoken of in greater detail hereinbelow, may be easily accommodated in accordance with well known principles over the broad range of from about no load to about 250% load with any desired manufactured droop characteristic. Frequency control and load division control, however, are more difficult problems particularly in higher frequency systems such as 400 cycle or 420 cycle systems commonly employed in more recent aircraft installations.

It is, therefore, an important object of the present invention to provide an efficient and economical system for accurately controlling the frequency and load division of paralleled alternators for proper synchronous operation while paralleled on a common supply line.

It is another object and feature of the present invention to accurately control a turbo-driven alternator system employing the principles of droop characteristic functions.

The droop characteristics of an alternator are the characteristics of speed and/or voltage or the like as plotted against percentage of full load. In many alternators the voltage versus percentage of load characteristic, when uncontrolled, has a very severe droop as full load is approached and often drops to substantially zero output as higher loads than rated full load are approached. However, by controlling the voltage output of an alternator in accordance with well known principles and particularly through the application of a proper voltage regulator or the like the voltage droop characteristic can be accurately controlled from substantially no droop whatever to any desired degree of droop. In employing voltage regulator systems such as carbon pile voltage regulator systems together with control systems embodying the principles of the present invention, it is preferred that the voltage droop characteristic be a substantially straight line with a preferred slope of about 5%, as an example. This percentage value indicates the drop in voltage at full load with respect to the output voltage of the alternator at no load. Such a manufactured droop characteristic can be properly uniformly established from alternator to alternator so that a plurality of the same may be paralleled and all of the same have substantially identical droop characteristics.

The speed droop characteristic, however, is not so easily controlled and is subject to a greater number of variables than those which control the voltage droop characteristic. As an example, in pneumatic turbine driven alternator systems variation in air supply line conditions as well as variations in air supply and variations in loading on the turbine together wth temperature and other variable conditions are effective to cause the speed versus load droop characteristic to have extremely different features from alternator drive system to altenator drive system. Various types of governor controls have often been proposed, heretofore, but none of these have been found satisfactory for highly accurate and high speed control.

It is, therefore, another important object of the present invention to accurately control the speed of the drive system for an alternator.

It is another object of the present invention to provide an accurate and efficient control for an alternator and drive system therefor operable to control the speed of the drive system and therefore the frequency of the alternator thus effecting accurate control for synchronization of a plurality of alternators which may be paralleled to a common supply line as desired.

Still another important object of the present invention is to provide a turbine driven alternator system with an accurate and efficient load division control so that paralleled alternators may effectively supply power to a load and each have a proper proportion of the load supplied therefrom.

This problem of load division is another problem which frequently seriously hampers paralleling of two or more alternators. Frequently the load division problem between parallel alternators is so critical as to be the controlling problem regarding the selection of alternators and drive systems and the like since improper load division control not only results in an improper function of various of the alternators employed but also results in the more serious difficulty of certain of the alternators operating as motors and further loading other of the alternators so that these latter alternators will "burn up" under a sustained excess loading.

With proper load division control of paralleled alternators, however, a supply system may be provided to supply electric power many times the available energy from any single given alternator.

Paralleling alternators rather than driving an alternator of increased capacity is preferred as a most efficient type of electric supply system since through utilization thereof it is unnecessary to overcome all of the losses involved in using a large generator when only a small quantity of electrical energy is required. Therefore, it has been found most desirable to provide an electrical supply line with a plurality of generator systems connected in parallel and essentially and necessarily synchronized.

Thus, it is another important object of the present invention and principle thereof to provide a control system operable to effect proper synchronization of paralleled alternators and proper load division therebetween.

Still another object of the present invention is to provide a control system for a turbo driven alternator or the like wherein a control signal is taken from the alternator drive to operate and control a transducer system effective to control the energy source for the turbine drive mechanism.

It is still another object of the present invention to provide an alternator mechanism for parallel connection with other alternators each having a load sensing signal system operable to generate a signal to control a transducer mechanism in turn controlling the energy available to each of the mechanisms driving each alternator.

Still another object of the present invention is to provide a control system for alternators individually or in parallel with load sensing means and speed sensing means for feeding control signals to a transducer system controlling the input energy to the drive mechanisms driving the alternators.

Still another object of the present invention is to provide a control for a pneumatically driven alternator wherein a pneumatic positioning transducer, effective to combine porportional action and reset action, controls the air flow to the turbine driving the alternator.

Still another important object of the present invention is to provide a control system wherein control signals are fed to a discriminator circuit the output of which controls the energization of a magnetic amplifier or the like and that in turn controls the operation of a pneumatic valve positioning transducer system.

Still another object of the present invention is to provide control systems embodying the principles of the present invention with a rate feature in the control signal portions of the system whereby variations in alternator speed are "anticipated" and the system is stabilized.

Still other objects, features and advantages of the present invention will become readily apparent from the following detailed description of the present invention and preferred embodiment thereof, from the appended claims and from the accompanying drawings which form a part of this specification and the disclosure thereof and are intended to fully and in detail completely disclose each and every feature thereon illustrated, in which like reference numerals refer to like parts, and in which:

Figure 1 is a block schematic illustration of a preferred control system embodying the principles of the present invention and thereby forming a preferred embodiment of the present invention;

Figures 2, 3 and 4 taken together and in consecutive order illustrate the preferred embodiment of the present invention of Figure 1 in full schematic form.

One of the important objects of the present invention is to provide an alternator synchronism with accurately regulated speed when subjected to disturbing forces and also to maintain accurate steady state speed regulation together with accurately controlling the speed of the system when the same is subjected to changes in electrical load and changes in pressure and energy of the supply to the turbine drive mechanism. This is accomplished through the use of a control employing the functions of proportional action and reset action over the manufactured scheduled load droop and further with the introduction of a load sensing signal and rate action effective as an aid in stabilization of the control system.

In the system illustrated in block schematic diagrammation in Figure 1 an alternator 1 is driven by an air turbine or the like 2, as a preferred example of a drive system for this turbo driven alternator arrangement. The alternator 1 and air turbine 2 are connected together through a gear box or the like 3 which has an additional output operative to drive a tachometer generator or the like 4 in positive coupled speed relation with the alternator 1 so that the frequency of the alternating current output of the generator 4 is idential or proportional to the frequency of the output of the alternator 1.

The output of the tachometer generator 4 is coupled to a frequency discriminator system 5 which feeds an output that has a direction (sign) and amplitude which are a function of the variation in frequency between the output of the tachometer generator 4 and a preselected standard control frequency. The frequency discriminator 5 feeds an error signal to a magnetic amplifier or the like 6 as a preferred form of control device which in turn provides its output to a torque motor or the like 7 converting the amplified error signal to a mechanical error signal operating a valve actuator 8 thereby controlling the pneumatic supply line valve 9 in turn controlling the air supply to the pneumatic turbine 2 through the supply line 10.

In addition the system is supplied with a reset signal source 9' energized from the tachometer generator 4 and controlled by the actuator 8 for feeding a signal of proper sign and amplitude back to the magnetic amplifier 6.

Systems embodying the principles of the present invention also preferably include a load sensing network 11 coupled to at least one line of a preferably three phase output from the alternator 1 in front of the alternator connection to the output of other paralleled systems supplying the load 12. That is, the load sensing network 11 is connected to the alternator 1 individually rather than to the load 12 which is supplied with power from several alternators as indicated by the supply lines 13 leading from the alternator 1 and the parallel connected supply lines 14 leading from other alternators and so paralleled with the lines 13 as to supply the load 12 over buses 15. The load sensing network 11 is connected to the supply lines 13.

A mixer in the line between the frequency discriminator 5 and magnetic amplifier 6 is operable to combine the output of the load sensing network 11 and the frequency discriminator 5 and further operable to mix a signal from a speed depress network 7' into the feed line to the magnetic amplifier 6 for reducing the speed of the alternator 1 immediately prior to parallel connection with the lines 13 and 14 for proper synchronized paralleling of the alternator 1 with other alternators similarly controlled. The mixer 16 therefore has a three signal input from the frequency discriminator 5, the load sensing network 11 and the speed depress network 7', with a single output to the magnetic amplifier 6.

The control action of this system is somewhat as follows:

The tachometer generator 4 supplies a signal to the frequency discriminator 5 which has an output potential proportional in sign and amplitude to the deviation of the speed of the alternator and air turbine from the no load speed setting or preestablished proper operating frequency for the system. If the speed is low due to a sudden application of an electrical load, the pneumatic positioning transducer including the magnetic amplifier 6, the torque motor 7, the actuator 8, the valve 9 and the reset system 9', accepts the error signal from the frequency discriminator 5 through the mixer 16 and converts it into an equivalent valve displacement. In the case of a sudden increase in electrical load the valve is rapidly moved open an amount proportional to the error signal potential. This sudden motion prevents the speed from departing by more than a fixed amount for any electrical load applied to the alternator.

The continued existence of this signal would then operate to maintain the valve 9 open a sufficiently increased amount to prevent any deviation in speed of the pneumatic turbine and alternator. The simple straight line control of the frequency discriminator, magnetic amplifier, torque motor, actuator and valve would not, however, maintain the valve open this required amount since any correction in the valve position would tend to decrease the signal output of the frequency discriminator 5. This decrease in the output signal from the frequency discriminator would have an ultimate tendency to decrease the energization of the torque motor and therefore the actuator thus decreasing the opening at the valve 9.

Thus the system without any reset action would establish a new speed and frequency level and a level somewhat below the preselected values therefor in order to establish equilibrium or balance position for the opening of the valve 9 and signal output from the frequency discriminator, which output is an error between the speed of rotation of the alternator 1 or tachometer generator 4 and preselected frequency for the system.

To prevent this establishment of a new, lower level, frequency for the system, the system is provided with a reset network within the pneumatic transducer. Without the reset action we have a proportional action which is highly important to proper operation of the system but insufficient to maintain the valve 9 open to its proper amount upon an increase in the load 12. The reset network 9' is interconnected mechanically with the actuator 8 so that an increased opening in the valve 9 will feed back a signal of increased potential to the magnetic amplifier and thereby feed back a signal operative to maintain the valve opening 9 a proper amount to maintain the alternator speed and therefore the frequency thereof constant at the preselected level.

With the reset action and the proportional action in combination together the valve will move relatively slowly at the end of its cycle to an open position of sufficient amount to maintain the alternator speed constant and to return the speed of a unit to the no load speed setting. When this process has been completed the output voltage of the frequency discriminator will be zero whereas the output from the reset network 9' will be sufficient to maintain the valve at the opening necessary therefor. The slowing down at the end cycle is due to the decrease in the output of the frequency discriminator as the system approaches its preselected frequency.

Another explanation of the action of the control the box 9 obtains by considering it as divided into two (2) blocks "proportional feedback" and "reset network." The basic purpose of the mechanically linked differential transformer included in the systems as further described below is to provide proportional control. Without the reset network the system is so arranged that the signal from the frequency discriminator is cancelled out by the proportional feedback from the differential transformer. Inserting the reset network in series with the feedback signal allows a feedback signal to be applied to the magnetic amplifier under high rate of change conditions. This maintains the fast proportional action required to prevent speed from departing too far from the preselected value during rapid transient conditions. Following a high rate of change condition, the reset network causes the feedback signal applied to the magnetic amplifier to gradually diminish. The decay of this signal causes a slow continued motion of the valve until the speed of the system is returned to the preselected value. At this time the net input signal is zero and no further motion of the valve occurs. It might be pointed out that any input to the magnetic amplifier will cause a motion of the actuator, and consequently the valve, until the signal is removed or balanced out by the presence of an equal and opposite signal, such as the feedback signal. When the signal applied to the magnetic amplifier is zero the actuator will remain at the position which it last attained.

The stability of the control has been insured by the provision of a rate action network within the mixer stage 16. The precise network will be described in detail hereinbelow and for the present it is sufficient to point out that this rate action network causes the valve to "overshoot" or "anticipate" rapid changes in speed. In effect it tends to compensate for the inertia of the turbine which has an adverse effect on the stability of the control. In fact the system does not "anticipate" but it does have extremely fast response for feeding the output of frequency discriminator through to the electropneumatic transducer.

When paralleling alternators it is usually essential to accomplish load division between the same. It has been found most practical to accomplish this load division through the use of the so-called "droop method." This means that for every load on the alternator there is a unique speed setting. A typical value for a straight line droop characteristic is 5% for a no load to full load speed change as well as for a no load to full load voltage change. This type of action (drop in speed with load) is typical of a pure proportional speed control system. Thus the required droop could be obtained by adjusting the gain of a simple proportional control to the correct value. Unfortunately, however, the gain (and hence the droop) of a pneumatic system such as that constituting a preferred embodiment of the present invention, changes markedly with the pressure and temperature of the air supply to the turbine. In addition, the effect of small valve displacements of the turbine speed varies with the absolute valve position. These and other similar effects (changes in damping for different electrical loads and turbine operating regions) cause the droop of the system to vary considerably over the required operating range of the turbine alternator drive. The droop curve would thus be unpredictable and poor load division would result. In addition the speed regulation would be poor under some conditions.

To circumvent these difficulties and to insure good load division and speed regulation is one of the important objects of this invention. This has been accomplished in accordance with the principles of the present invention by the introduction of an electrical means for sensing the real load by an alternator. Further the reset feature has been added to eliminate the difficulties encountered with a simple proportional system. The action of the real load sensing device is to add a voltage to the output of the frequency discriminator 5 such that there is only one given effective null frequency for every electrical load on the alternator 1. The reset feature dictates that the unit will run at a speed determined only by the no-load speed setting and the electrical load on the alternator. Thus a unique droop curve for all operating conditions can be obtained and this droop curve can be reproduced between units with efficient precision to assure accurate load division and paralleling of generator unit systems.

Another precaution has been added in accordance with the principles of the present invention since the electrical characteristics of the system would normally cause the frequency and voltage system to be lowered substantially instantaneously by an amount proportional to the added electrical load by virtue of the operating characteristics of the load sensing network. This would normally cause the valve 9 to move in a direction to decrease the speed of the unit when the load is increased (closing action instead of opening as required). Proper action has been obtained by the introduction of a lag network on the output of the real load sensing network 11. This increases its time constant to a value comparable with the inertia of the mechanical pneumatic system which also determines the reset time.

The details of the various networks hereinabove described in regard to their functional operation will be dealt with below in conjunction with Figures 2, 3 and 4, which when juxtaposed, illustrate in detail the schematic form for the system shown in block diagrammation in Figure 1. It will be understood from the foregoing, however, that systems embodying the principles of the present invention are operative to accomplish the above described results and functions in a new and improved manner and are subject to numerous variations.

From Figure 3 it will be observed that the alternator 1 is coupled to a pneumatic turbine 2 through a gear box or the like 3 and that driving energy such as air under pressure is provided to the turbine through an air supply line or the like 10. The output of the alternator 1 is preferably a three phase supply put out over lines 13 which are coupled to lines 14 (Figure 2) leading to paralleled alternators and buses 15 leading to the load 12. The gear box 3 has an output shaft 20 coupling the same to a tachometer generator 4 which has an output frequency substantially identical to the output frequency of the alternator 1.

The output of the tachometer generator 4 is directly coupled to an isolation transformer or the like 21, the secondary of which is coupled through lines 22 and 23 to a pair of transformers 24 and 25 and specifically to the primaries 26 and 27 thereof respectively connected in series (Figure 2).

The transformers 24 and 25 provide the input stage for the frequency discriminator indicated generally at 5. The secondaries 28 and 29 of the transformers 24 and 25, respectively, each form part of a tuned system and each are paralleled with a capacitor 30 and 31 respectively.

In accordance with the principles of the operation of a frequency discriminator of this character, the system including the secondary 28 and capacitor 30 is tuned to a frequency which varies from the preselected control frequency by a predetermined deviation value. For example, if the preselected control frequency is 420 cycles per second then the system formed by the secondary 28 and the capacitor 30 may be tuned to a frequency of, for example, 25 cycles above the control frequency of 420 cycles, or 445 cycles. The tuned system including the secondary 29 of the transformer 25 and the capacitor 31 connected in parallel therewith, in this example, would be tuned to 25 cycles below the preselected control frequency, or 395 cycles per second. It is not critical that the system 28—30 be tuned to a higher frequency and that the system 29—31 be tuned to a lower frequency but it is important that whichever is higher and whichever is lower should be selected to coordinate with the remainder of the system as described above and further described in detail hereinbelow.

Each of the systems is connected to separate full wave rectifier bridge networks 32 and 33 so as to full wave rectify the outputs thereof and feed D. C. signals to resistance capacitance filter networks 34 and 35 connected across each thereof respectively. These filter networks 34 and 35 are preferably also connected together by a center lead 36 interconnecting the outputs of the rectifiers 32 and 33.

The rectifiers 32 and 33 are, as stated, preferably full wave bridge networks but need not be so formed and may be half wave rectifier elements such as diodes or selenium oxide or copper oxide forms of rectifiers. The bridge type full wave rectifier networks illustrated, are preferred however. The filter networks 34 and 35 are also preferably substantially identical each having a parallel capacitor-resistor arrangement, the two parallel capacitance resistance filters being connected in series and the output thereof being impressed across an output capacitor 37 connected across the extremes of the networks as indicated at 38 and 39.

This type of frequency discriminator system is so operative that when an input signal of, for example, 420 cycles is provided thereto as described above for the preselected control frequency, then the output of the system will be substantially a null output since the rectifiers 32 and 33 and the filters 34 and 35 are connected in a series opposing relation and the filter network 34 is provided with an additional balancing potentiometer 40 operative to adjust the filters 34 and 35 for precision balancing thereof.

When the input signals to the frequency discriminator network 5 has a frequency above the preselected control frequency for the system, then the output from the system 28—30 will be greater than the output from the system 29—31 thereby presenting a higher voltage across the filter network 34 than the potential across the filter network 35 thereby presenting an output potential across the output capacitor 37 which has a potential sign and amplitude corresponding to the deviation of the frequency of the input signal from the preselected control frequency. This output will therefore be a function of the stated deviation. Similarly, when the input frequency is below the preselected control frequency, then an output will be provided across the output capacitor 37 of opposite sign and of an amplitude proportional to the deviation. Thus, this frequency discriminator system is operative to provide an output signal which is a function of the deviation between the proper preselected control frequency and the frequency of the alternator 1 or the tachometer generator 4.

The output signal from the frequency discriminator 5 is fed through the mixer network 16 via lines 42 and 43 to the magnetic amplifier indicated generally at 6. This input signal is fed to a first control coil 41 in the magnetic amplifier 6.

The magnetic amplifier 6 is an extremely rugged signal amplifying device of the class commonly known as "D. C. amplifiers." Although magnetic amplifiers are generally well known in the art, the magnetic amplifier 6 is a new and improved magnetic amplifier having an extremely fast response time on the order of one and one-half cycles of the input frequency and is extensively simplified.

In accordance with the principles of the present invention, the magnetic amplifier 6 is a two stage push pull type magnetic amplifier having a first stage identified generally by the numeral 6a and a second stage identified generally by the numeral 6b. In the first stage 6a the magnetic amplifier is provided with an input from the secondary of the transformer 21 via leads 44 and 45. A pair of alternating current input coils 46 and 47 are connected in parallel and each is magnetically associated with a D. C. partial saturation coil 48 and 49 respectively. The coils 48 and 49 are each connected in series with a half wave rectifier 50 and 51 respectively and matched output primary coils 52 and 53 respectively. From a center point between the coils 52 and 53 the circuits are completed through a limiting resistor or the like 54 back to the line 45, the A. C. input coils and the partial saturating coils each effectively have one end thereof connected to the line 44. In addition, small limiting resistors 55 and 56 are connected in series with each of the A. C. input coils 46 and 47 respectively, individually.

The operation of this portion of the magnetic amplifier 6, the first stage 6a of the magnetic amplifier 6, is such that with no signal input to the coil 41 the energization of the A. C. output coils 52 and 53 will be equal and opposite thereby providing a null output from the first stage of the magnetic amplifier. If, however, a signal is provided on the lines 42 and 43 which is impressed upon the coil 41 from the frequency discriminator by virtue of an error signal such that the coil 41 has a polarity indicated by the direction of the arrow then the core for the A. C. input coil 46 will be driven closer to magnetic saturation and the core for the A. C. input coil 47 will be removed further from saturation thereby permitting an increased current through the partial saturating half wave rectified D. C. coil 48 and the associated output primary coil 52 and similar reduced current in the primary output 43 with a resultant output from these normally balanced coils 52 and 53. An opposite signal on the coil 41 will produce an opposite effect on the output of the first stage 6a of the magnetic amplifier 6.

It should be understood from the foregoing that this system is a matched balanced half wave system and whereas the coils 46 and 47 have been described as the A. C. input coils they are functionally the partially saturating coils of each group while the coils 48 and 49 in series with half wave rectifiers are truly the coils the saturation of which controls the passage of current to the output primaries 52 and 53. The output primary coils 52 and 53 are substantially identical magnetically and connected in opposition so that, as described, a balanced input thereto produces a null magnetic output and unbalanced inputs produce outputs which have signs and amplitudes functionally controlled by the error signals and therefore are functions of the errors between the preselected control frequency and the frequencies of the output of the alternator 1 and tachometer generator 4.

The second stage 6b of the magnetic amplifier 6 is a push pull stage of the power amplifier variety deriving its input control signal from the primaries 52 and 53 of the first stage 6a. The single resultant output of the stage 6a is impressed upon a coupling transformer secondary 57 and the A. C. power input is derived directly from the tachometer generator 4 via lines 58 and 59.

The second stage 6b of the magnetic amplifier 6, the power stage, is quite similarly arranged to the first stage 6a in that it is provided with a pair of A. C. input coils 60 and 61 each in series with a small limiting resistor 62 and 63 and the two series circuits are connected in parallel across the lines 58 and 59. In addition a pair of coils 64 and 65 are each connected in series with a half wave rectifier or the like 66 and 67 respectively and each is magnetically associated with the coils 60 and 61 respectively as shown. The two coils 64 and 65 are also connected with a matched pair of output coils 68 and 69 which are connected in series opposition and from a center point therebetween the circuit is completed to the line 59; the coils 64 and 65 having been connected through the half wave rectifiers 66 and 67 to the line 58.

The matched and balanced output coils 68 and 69 also form a part of the next stage of this control system and specifically form a part of the torque motor 7 and are reproduced on Figure 4 to illustrate this preferred form. A pair of smoothing condensers or the like 70 and 71 are connected across the output coils 68 and 69 to provide the coils 68 and 69 with smooth D. C. potentials across the same and which nullify each other at no error (leaving the feed back system and reset action unconsidered at this point).

Thus it will be observed that the power stage 6b of the push pull magnetic amplifier 6 is readily adapted to produce an output which has a sign and amplitude which are a function of the error in the frequency and speed of the alternator 1. In order to insure a proper gain adjustment in the output a small potentiometer or the like 72 is connected in series with the input control coil of the second stage 6b and is adjusted for a null at no load and no error. The output from the magnetic amplifier power stage 6b is a null at no load and no error, but with an error signal provided on the coil 57 which is the secondary of the coupling transformer between the stages 6a and 6b, increased current will flow in one of the coils 64 and 65 while a decreased current will flow in the other of them according to the characteristics of the error signal thus producing an output of one sign or the other as a resultant output of the magnetic characteristics of the balanced coils 68 and 69.

As stated hereinabove the coils 68 and 69 form a part of the torque motor 7 which has been illustrated in Figure 4 as a magnetic device having substantially stationary windings 68 and 69 and a center pivoted permanent magnet, armature bar 73 pivoted as at 73a so as to be magnetically coupled to the coils 68 and 69, one half for each coil. Although the more well known form of torque motor and perhaps the form of more practical importance includes stationary horseshoe magnetic members and rotatable coils, the form of torque motor shown here simplifies the understanding of the present invention.

At one end of the armature bar 73 a quill 74 interconnects the armature bar 73 and the double or dumbell piston arrangement including pistons 75 and 76 of a pilot valve indicated generally at 77 in the actuator mechanism 8.

The torque motor windings 68 and 69 and the armature bar 73 are so arranged that at a null error no load condition the symmetrical arrangement illustrated obtains. Under an error signal condition or a loaded condition one of the coils 68 and 69 is effective to draw the contiguous portion of the armature bar 73 thereto thereby moving the double piston arrangement of the pilot valve 77 in an appropriate direction depending upon the character of the error and/or load signal.

If the resultant output magnetic characteristic of the torque motor windings 68 and 69 is such as to draw the end of the armature bar contiguous with the coil 68 into more proximate relation with the coil 68 the pilot valve pistons 75 and 76 will be moved to the left in the schematic drawing of Figure 4.

Such movement of the pilot valve pistons 75 and 76 will operate to permit fluid flow through the conduit or channel 78, associated with the piston 75, to enter the cylinder chamber 79 of the actuator, double acting piston-cylinder arrangement, indicated generally at 80 so as to move the piston 81 thereof to the right as indicated on the drawing. At the same time the piston 76 of the pilot valve 77 will also be moved to the left to exhaust the right hand portion of the cylinder chamber 79. An opposing signal presented to the torque motor windings 68 and 69 would create a diametrically opposite effect moving the piston 81 to the left. Under no load and no error conditions the armature bar 73 rests in a neutral position as illustrated effecting a centering position for the piston 81. The piston rod connected with the piston 81 extends from both ends of the cylinder chamber 79 and at one end thereof is connected to a baffle plate valve or other desired type of valve 9 in the turbine energy supply line 10. Thus by controlling the position of the valve 9 the amount of energy available to drive the turbine 2 is effectively controlled as herein above described in conjunction with the functional description with respect to Figure 1 of the drawings.

Also as hereinabove described, it is highly desirable and a feature of the present invention to add a reset action which as a feed back arrangement maintains the turbine 2 at constant speed rather than at a new lower speed for each load and speed variation. This reset action is accomplished through a reset network indicated generally at 9'. The reset network 9' includes first a balance transformer preferably concentrically wound with a single longitudinally extending primary 82 and concentrically wound and axially displaced symmetrical secondary windings 83 and 84, schematically illustrated in Figure 4. The core 85 of this transformer is connected to the piston rod of the piston 81 so that movement thereof axially within the transformer windings effectuates a variation in coupling between the primary 82 and each of the secondaries 83 and 84. The primary 82 is energized from the lines 22 and 23 at the secondary output of the transformer 21 coupled to the tachometer generator 4.

Each of the secondaries 83 and 84 is connected across the rectifier network such as the preferred full wave rectifier bridges 86 and 87, respectively and individually, and the outputs of the bridges 86 and 87 are impressed across serially connected resistance-capacitance filters 88 and 89 respectively, connected in series opposition so that under balanced conditions there is a null output from the filters 88 and 89 at the extremes thereof.

Thus, under no error and no load conditions with the piston 81 centrally disposed in the cylinder 79, the core 85 for the transformer including coils 82, 83 and 84 center positioned for balanced coupling of the primary to the two secondaries there is a no output across the feed back leads 90 and 91 of the reset network. When there is displacement of the core 85, however, then an appropriate signal is transmitted back through the feed back lines 90 and 91 connected to the output of the reset network 9' and feeding back through a reset capacitor 92 and a reset and proportional resistor or the like 93 to a feed back control winding 94 in the magnetic amplifier 6 and magnetically additive with the first control winding 41. A signal from the frequency discriminator 5 will effect initial movement of the actuator 8, valve 9 and transformer core 85 thereby causing a feed back, proportional and reset signal to maintain the valve 9 in its new open or closed position. The operation of this system is as described above in conjunction with the block schematic diagram of Figure 1.

It was also stated hereinabove that the system is provided with a real load sensing signal network 11 which is illustrated in detail in Figure 2. The real load sensing network 11, functionally operative as described hereinabove includes a current sensing element 95 mixingly coupled to a potential sensing transformer 96 such that the output of the mixed current and potential signals is a function of the power transmitted from the alternator 1 over the lines 13. This output is effectively a balanced output and impressed across a pair of transformers 97 and 98 the primaries of which are serially connected in opposition and the secondaries of which are connected across rectifier networks such as full wave rectifier bridges 99 and 100 converting the output from the transformers 97 and 98 to a squared relationship. The bridges 99 and 100 have their outputs connected across serially connected opposingly arranged smoothing filters 101 and 102 for presenting a null output from the load sensing network 11 under no load conditions.

Since under loaded conditions the load sensing network would be operative to feed a signal into the mixing stage 16 which is in opposition to the speed sensing signal provided at the output of the frequency discriminator 5, the load sensing network 11 is provided with a delay network including such elements as a resistor 103 and capacitor 104 and the like to delay the load signal for a time corresponding to the inertia time of the mechanical portions of the system and the time lag of the very high speed and fast acting magnetic amplifier 6. Signal from the load sensing network 11 is impressed across a resistor element or the like 105 connected between the line 42 and the point 38 of the output of the frequency discriminator 5 and mixing stage 16.

The opposition of the load sensing signal to the speed sensing correction signal results by virtue of the fact that when the speed decreases it is necessary to provide a signal operative to effect an increase in the speed of the system back to the no load system whereas when an excess load or merely an increased load is provided on the alternator it is important to provide a signal operative to effect a slight decrease in the speed of the alternator and thereby permit the alternator to only carry a reduced portion of the load. This latter load sensing signal effect results in a redistribution of the load and a partial transference thereof to other alternators connected in parallel with the alternator 1 as over the lines 14. A balance between several paralleled alternators is effected most quickly and in a non-oscillating manner through the employment of control systems embodying the principles of the present invention.

To allow an alternator to be coupled onto the line the control system is provided with a speed depress network indicated generally at 17 (Figure 2) which provides a signal into the mixer stage 16 and specifically into the line 43 by the insertion of a resistor or the like 106 connected into the line 43 and connected in circuitry operative to generate a signal effective to reduce the speed of the system. This circuitry includes a resiliently biased armed potentiometer or the like 107 in series with a bias signal source 108 and a single pole single throw switch or the like 109. Depression of the arm of the potentiometer 107, when the switch 109 is closed, provides a proper signal across the resistor 106 to effect a speed reduction in the alternator 1. Immediately upon coupling the systems they will lock into synchronism and releasing the arm of the potentiometer 107 will urge the same to its neutral position by the spring bias member or the like 110 connected thereto.

Another important feature of the present invention includes the rate action provisions within the mixer stage 16 whereby variations in the load and/or speed of the alternator 1 are effectively "anticipated" and the system is provided with a very fast action for rapid changes in these parameters and for blocking action or proportional action under slow change conditions. This action is effected through the provision of a capacitor 111 in series with the line 42 and in parallel with a small resistive element or the like 112 in addition to a second resistive element or the like 113 also in series with the line 42. Rapid signal variations emanating from the frequency discriminator 5 pass almost immediately through the capacitor 111 and resistor 113 to the magnetic amplifier and thereafter to the torque motor and actuator and reset mechanism etc. to cause an appropriate variation in the opening of the valve 9. Slower variations are transmitted through this network as a combination resistive capacitance network in accordance with the principles of the present invention.

As has been mentioned hereinabove the reset action is provided with both reset and proportional conditions obtaining in the feed back network. This is preferably effected through the operating characteristics of the capacitor 92 and the resistor 93. Under high rate of change conditions the capacitor 92 transmits the feed back signal through to the feed back control winding 94 from the reset network 9' with extremely high speed conductivity and thereafter acts as a blocking condenser effective to maintain the proper signal on the feed back control winding 94.

As an example of the operating features of the capacitor 92 it has been found that should the capacitor 92 be short circuited and thereby not permitted the blocking action which obtains through its use, the system would not operate as effectively to provide a proper reset signal but would be principally proportionally operative.

From the foregoing detailed description of the preferred embodiment of the present invention illustrated schematically in Figures 2, 3 and 4 it will be readily observed that the system is operative in accordance with the principles of the present invention as described above in the description of the functional operation of the system illustrated in the block schematic diagram of Figure 1.

It will be understood, of course, that numerous variations and modifications may be effected without departing from the true spirit and scope of the present invention. We, therefore, intend by the appended claims to cover all such modifications and variations as fall within the true spirit and scope of the principles of our invention.

We claim as our invention:

1. In a system to control alternator operation, in combination, means to sense the operating frequency of the alternator as a function of the speed of rotation thereof, means to produce an output signal variable in sign and amplitude as a function of variations in signals produced by the frequency sensing means, and a flow control transducer mechanism coupled to said latter means and responsive to the output signal thereof to control energy available to drive said alternator, said transducer means including a feed back system of combined proportional and reset qualities.

2. In a system to control alternator operation, in combination, means to sense the operating frequency of the alternator as a function of the speed of rotation thereof, means to produce an output signal variable in sign and amplitude as a function of variations in signals produced by the frequency sensing means, and a flow control transducer mechanism coupled to said latter means and responsive to the output signal thereof to control energy available to drive said alternator, and alternator load sensing means further coupled to said transducer mechanism to provide a signal thereto variable in sign and amplitude as an inverse function of the load on said alternator, said transducer means including a feed back system of combined proportional and reset qualities.

3. In a system to control alternator operation in combination, sensing means to sense preselected operating parameters of said alternator, and electro-mechanical transducer means coupled to said sensing means to control alternator operation in accordance therewith, said transducer means including a feed back system of combined proportional and reset qualities.

4. In a system to control a plurality of parallel alternators to insure proper load division therebetween and substantially constant output frequency and potential values for each thereof, in combination, frequency sensing means coupled to each of said alternators and each operable to produce a signal having a sign and amplitude which is a function of variation in the frequency and load respectively of the alternator to which it is coupled, a transducer mechanism coupled to said latter means and responsive to the output signal thereof to control energy available to drive said alternator, said transducer means including a feed back system of combined proportional and reset qualities.

5. In a system to control a plurality of parallel alternators to insure proper load division therebetween and substantially constant output values for preselected parameters of each thereof, transducer means coupled to each of said alternators and to power drive mechanisms for each thereof, load sensing means coupled to said transducer to effect variations therein inversely with respect to load variations and other sensing means coupled to said transducer to effect variations therein to maintain said preselected parameters substantially constant, said transducer means including a feed back system of combined proportional and reset qualities.

6. A control system for pneumatically driving alternators comprising alternator speed and frequency sensing means providing a signal corresponding to the speed and frequency of the alternators, a frequency discriminator network coupled to said means and operable to provide an output having a sign and amplitude which are a function of the difference between the frequency of the alternators and a preselected frequency, a magnetic amplifier controlled by the output of said frequency discriminator, a torque motor controllably energized by said magnetic amplifier, a double acting pilot valve and a double acting control-piston cylinder assembly connected to said torque motor, and means connected to said piston-cylinder assembly operable to vary pneumatic energy available to the pneumatically driven alternators, and a feed back system coupled to said piston-cylinder assembly and to said magnetic amplifier to maintain proper operation of the alternator.

7. A control system for pneumatically driving alternators comprising alternator speed and frequency sensing means providing a signal corresponding to the speed and frequency of the alternators, a frequency discriminator network coupled to said means and operable to provide an output having a sign and amplitude which are a function of the difference between the frequency of the alternators and a preselected frequency, a magnetic amplifier controlled by the output of said frequency discriminator, a torque motor controllably energized by said magnetic amplifier, a double acting pilot valve and a double acting control piston-cylinder assembly connected to said torque motor, and means connected to said piston-cylinder assembly operable to vary pneumatic energy available to the pneumatically driven alternators, and a feed back system coupled to said piston-cylinder assembly and to said magnetic amplifier to maintain proper operation of the alternator, said feed back system having combined proportional and reset operating characteristics.

8. A control system for pneumatically driving alternators comprising alternator speed and frequency sensing means providing a signal corresponding to the speed and frequency of the alternators, a frequency discriminator network coupled to said means and operable to provide an output having a sign and amplitude which are a function of the difference between the frequency of the alternators and a preselected frequency, a magnetic amplifier controlled by the output of said frequency discriminator, a torque motor controllably energized by said magnetic amplifier, a double acting pilot valve and a double acting control piston-cylinder assembly connected to said torque motor, and means connected to said piston-cylinder assembly operable to vary pneumatic energy available to the pneumatically driven alternators, and a feed back system coupled to said piston-cylinder assembly and to said magnetic amplifier to maintain proper operation of the alternator, said feed back system having combined proportional and reset operating characteristics and load sensing means interconnected with the alternator and the magnetic amplifier to effect proper load division when the alternator is connected in a parallel power system.

9. A control system for pneumatically driving alternators comprising alternator speed and frequency sensing means providing a signal corresponding to the speed and frequency of the alternators, a frequency discriminator network coupled to said means and operable to provide an output having a sign and amplitude which are a function of the difference between the frequency of the alternators and a preselected frequency, a magnetic amplifier controlled by the output of said frequency discriminator, a torque motor controllably energized by said magnetic amplifier, a double acting pilot valve and a double acting control piston-cylinder assembly connected to said torque motor, and means connected to said piston-cylinder assembly operable to vary pneumatic energy available to the pneumatically driven alternators, and a feed back system coupled to said piston-cylinder assembly and to said magnetic amplifier to maintain proper operation of the alternator, said feed back system having combined proportional and reset operating characteristics and load sensing means interconnected with the alternator and the magnetic amplifier to effect proper load division when the alternator is connected in a parallel power system, said load sensing means including a lag network to delay output signals therefrom.

10. A control system for pneumatically driving alternators comprising alternator speed and frequency sensing means providing a signal corresponding to the speed and frequency of the alternators, a frequency discriminator network coupled to said means and operable to provide an output having a sign and amplitude which are a function of the difference between the frequency of the alternators and a preselected frequency, a magnetic amplifier controlled by the output of said frequency discriminator, a torque motor controllably energized by said magnetic amplifier, a double acting pilot valve and a double acting control piston-cylinder assembly connected to said torque motor, and means connected to said piston-cylinder assembly operable to vary pneumatic energy available to the pneumatically driven alternators and load sensing means interconnected with the alternator and the magnetic amplifier to effect proper load division when the alternator is connected in a parallel power system.

11. A control system for pneumatically driving alternators comprising alternator speed and frequency sensing means providing a signal corresponding to the speed and frequency of the alternators, a frequency discriminator network coupled to said means and operable to provide an output having a sign and amplitude which are a function of the difference between the frequency of the alternators and a preselected frequency, a magnetic amplifier controlled by the output of said frequency discriminator, a torque motor controllably energized by said magnetic amplifier, a double acting pilot valve and a double acting control piston-cylinder assembly connected to said torque motor, and means connected to said piston-cylinder assembly operable to vary pneumatic energy available to the pneumatically driven alternators and load sensing means interconnected with the alternator and the magnetic amplifier to effect proper load division when the alternator is connected in a parallel power system, said load sensing means including a lag network to delay output signals therefrom.

12. In a plural alternator electrical supply system, an alternator, a turbine for driving said alternator, transducer means for controlling supply of fluid to said turbine, amplifier means coupled to said transducer means, a frequency discriminator coupled to said amplifier for effecting control of said transducer means to maintain a certain set speed of operation, a load sensing network responsive solely to the load on said alternator independently of the load on other alternators of the system, means for applying the output of said load sensing means to said amplifier means in a manner to gradually decrease the said speed of operation as the load on said alternator increases, feedback means between said transducer means and said amplifier means for effecting rapid response to changes in operating conditions, and means for modifying the action of said feedback means to prevent oscillation of the control system.

References Cited in the file of this patent
UNITED STATES PATENTS

| | | |
|---|---|---|
| Re. 20,548 | Doyle | Nov. 9, 1937 |
| 1,762,672 | Spennemann | June 10, 1930 |
| 1,863,302 | Geiselman | June 14, 1932 |
| 1,984,187 | Hayward et al. | Dec. 11, 1934 |
| 1,984,920 | Doyle | Dec. 18, 1934 |
| 1,985,081 | Doyle et al. | Dec. 18, 1934 |
| 2,050,338 | Kerr | Aug. 11, 1936 |
| 2,054,411 | Doyle | Sept. 15, 1936 |
| 2,458,325 | Warren | Jan. 4, 1949 |
| 2,504,768 | Watson et al. | Apr. 18, 1950 |